(12) United States Patent
Grieser et al.

(10) Patent No.: US 6,209,914 B1
(45) Date of Patent: Apr. 3, 2001

(54) BODY SHELL FOR A PASSENGER CAR WITH REDUCED OVERALL DEFORMATION

(75) Inventors: Herrmann Grieser, Sindelfingen; Volker Kauffmann, Renningen; Manfred Schultz, Wildberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/310,141

(22) Filed: May 12, 1999

(30) Foreign Application Priority Data

May 12, 1988 (DE) ............................................. 198 21 107

(51) Int. Cl.$^7$ .................................................... B60R 21/00
(52) U.S. Cl. .......................... 280/795; 180/312; 180/291; 296/204
(58) Field of Search ............................ 296/204; 280/781, 280/797, 795; 180/312, 311, 292, 291

(56) References Cited

U.S. PATENT DOCUMENTS

| | | | | |
|---|---|---|---|---|
| 3,108,836 | * | 10/1963 | Deckert | 296/204 |
| 3,791,472 | * | 2/1974 | Tatsumi | 180/312 |
| 4,369,559 | * | 1/1983 | Phillips | 180/312 |
| 5,409,264 | * | 4/1995 | Nakatani | 280/834 |
| 5,758,738 | * | 6/1998 | Carroll et al. | 180/292 |
| 5,806,918 | * | 9/1998 | Kanazawa | 296/204 |

FOREIGN PATENT DOCUMENTS

| | | |
|---|---|---|
| 1 074 416 | 1/1957 | (DE) . |
| 1 156 659 | 8/1957 | (DE) . |
| 34 04 801 A1 | 8/1985 | (DE) . |
| 39 05 650 C1 | 2/1989 | (DE) . |
| 1 486 529 | 7/1974 | (GB) . |
| 2 260 296 | 9/1992 | (GB) . |

* cited by examiner

*Primary Examiner*—Lanna Mai
*Assistant Examiner*—Lynda Jasmin
(74) *Attorney, Agent, or Firm*—Evenson, McKeown, Edwards & Lenahan, P.L.L.C.

(57) ABSTRACT

Known self-supporting body shells provide a floor area in the vehicle center which is formed by an engine transmission support, on which floor area the transmission case is fastened which is connected with the engine. A passenger car body shell is provided with connection arms constructed as profile pieces in the area between the side members and the engine transmission support. The connection arms are tension and pressure cross members. In the event of a crash, a deformation of the vehicle body is prevented in this area as well as a rotation of the engine and of the transmission which otherwise leads to an undesirable deformation of the vehicle body in the driver's and front passenger's area.

4 Claims, 2 Drawing Sheets

BODY SHELL FOR A PASSENGER CAR WITH REDUCED OVERALL DEFORMATION

BACKGROUND OF THE INVENTION

This application claims the priority of German application 198 21 107.4-21, filed in Germany on May 12, 1998, the disclosure of which is expressly incorporated by reference herein.

The present invention relates to a body shell for a passenger car, having two side members between which a main floor extends which, approximately in the area below the windshield, is provided with an engine transmission support for fastening the transmission case and with a tunnel accommodating this transmission case and the drive shaft.

Self-supporting body shells are known in many constructions. Thus, for example, DE 34 04 801 A1 shows a construction in which the forward parts of the wheel houses are integrated into a subassembly for the chassis in order to achieve a simpler assembly of such vehicle bodies whose support arrangements are formed of a plurality of parts which must be welded to one another.

Frame constructions for passenger cars are also known as seen, for example, in DE 11 56 659 C2, in which the frame end parts which project into the front end area and which also have a section expanding toward the vehicle occupant compartment, are closed at both ends to form a frame. The frame end parts are pulled up to form the side posts of the wheel house and are connected there. The connection with the center frame part takes place by way of a cross member in the area of the front end, but a connection is also provided between the frame end parts and the tunnel. Such frame constructions are no longer provided for modern, self-supporting body shells, however, so that the demand for body shells which are sufficiently stiff for absorbing deformation forces in the event of an impact of the vehicle exists independently of frame constructions which had been customary earlier.

In known body shells, the tunnel and the main floor together form corresponding receiving devices for screwing the engine is transmission to the vehicle body. In the event of a so-called offset crash, i.e., in a laterally offset frontal impact, however, deformations occur in this floor area which also, particularly if the vehicles are provided with V-engines, are triggered by rotating movements of the engine transmission block. This may, in turn, lead to an impairment of the free space in the occupant compartment on the driver's side or on the front passenger's side.

SUMMARY OF THE INVENTION

An object of the present invention is therefore to achieve in a body shell a reduction of the overall deformation, particularly also of a front wall intrusion and a tunnel expansion in the occupant compartment area.

In such a body shell, this object has been achieved by providing that connection arms, which are constructed as tension and pressure cross members, are provided between the side members or between member sections, which extend diagonally to the center axis of the vehicle and by which the spacing between the side members is enlarged behind the front end area, and the engine transmission support.

As a result, a rotating movement of the engine transmission block is largely prevented in the event of an offset crash. An expansion of the tunnel can also largely be prevented because the provided connection arms can absorb tensile as well as pressure forces and, since they are connected directly with the two side members of the vehicle body, increase the stability several times in the event of a transverse load.

According to another aspect of the present invention, the connection arms can be placed onto the main floor and can be profile pieces welded to the main floor and the member sections, and stamped from sheet metal. This permits an extensive adaptation to the desired stiffening functions.

A further feature of the present invention involves the profile pieces also being constructed as trapezoidal components which are provided with projecting reinforcing ribs and which extend, by way of one of their sides, approximately perpendicularly to the vehicle center axis, the narrower side of the trapezoidal component being fastened to the side member sections. This also contributes to a desired transmission of the forces acting upon the vehicle body. The reinforcing can be achieved in the desired areas.

Finally, in accordance with the present invention, the top side of the component can be aligned approximately horizontally with the top edge of the member sections and can be welded to them. The bottom sides of the projecting ribs are welded to the main floor extending below the upper edge of the member sections.

Other objects, advantages and novel features of the present invention will become apparent from the following detailed description of the invention when considered in conjunction with the accompanying drawings.

DETAILED DESCRIPTION OF THE DRAWINGS

Figure 1:
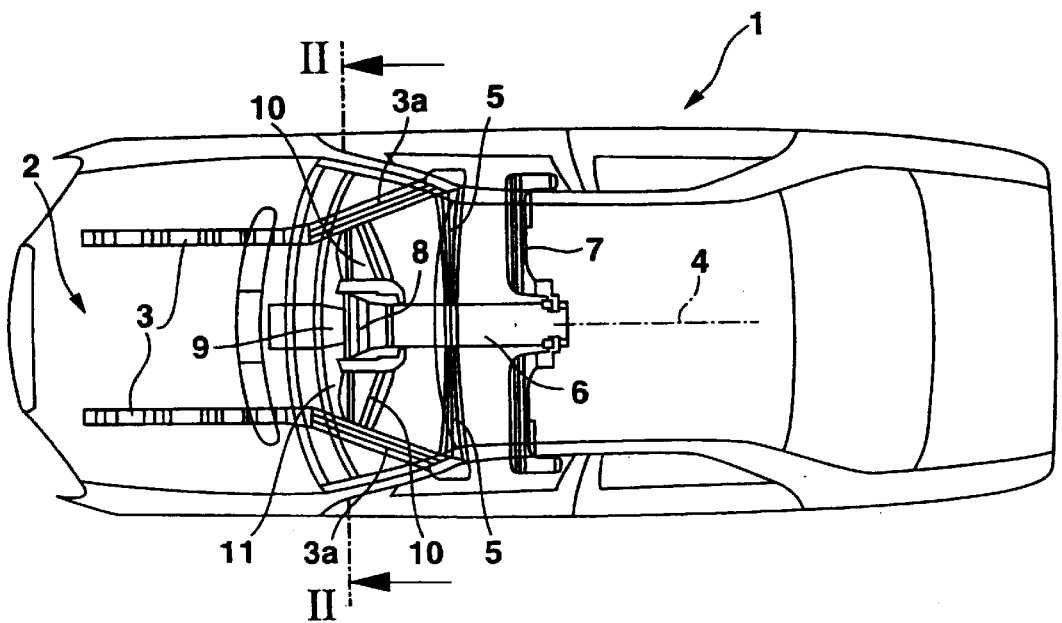
FIG. 1 is a schematic top view of a body shell according to the present invention.

FIG. 1 is a schematic view of a body shell 1 for a passenger car. In the area of the front end 2 of the car, into which area the engine is later inserted, the body shell 1 is provided with two parallel side members 3 whose mutual spacing, approximately in the area of the windshield to be provided later, is enlarged by respective member sections 3a which point toward the outside with respect to the vehicle center axis 4.

The ends of the member sections 3a are connected by a transverse reinforcement 5 which extends approximately to the tunnel 6. The transverse reinforcement 5 is situated in front of a cross member 7 which reinforces, in a known manner, the center area of the vehicle floor.

Also approximately in the area below the later windshield, an engine transmission support 8 is provided between the two member sections 3a. The transmission case 9 is fastened in a known manner on the engine transmission support 8 and is connected with the engine. Between the member sections 3a and the engine transmission support 8, connection arms 10 are constructed as tension and pressure cross members to be explained in detail by reference to FIGS. 2 to 5. These connection arms 10 represent a reinforcement in the area of the engine transmission support 8 which, in particular, has the purpose of providing, in the event of a transverse stressing of the vehicle body during a so-called offset crash, the required reinforcement of the engine linkage. In the event of such a crash, a rotating movement of the engine transmission unit is prevented and therefore a resulting excessive deformation of the vehicle body and of the tunnel is reduced.

Figure 2:
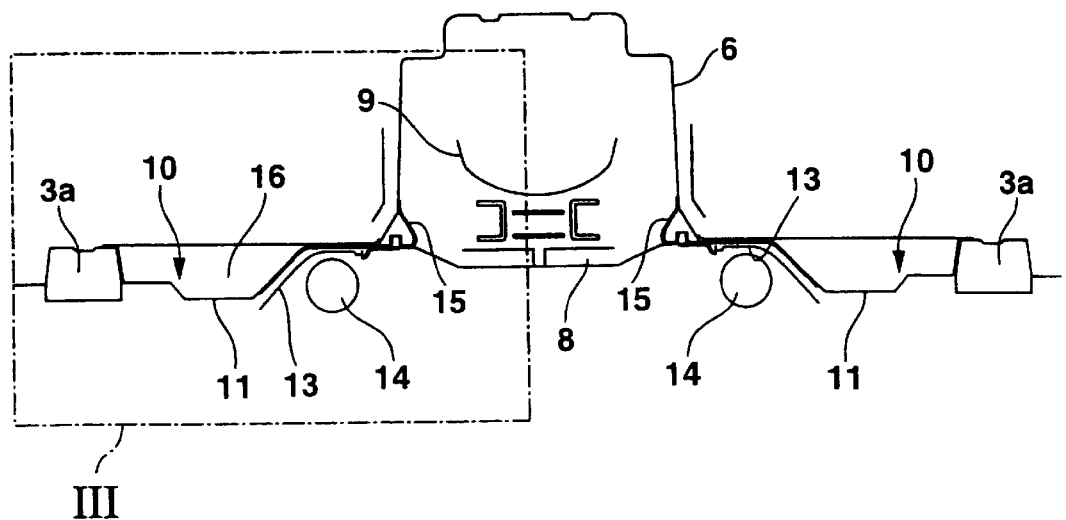
FIG. 2 is a schematic sectional view along line II—II in FIG. 1.
Figure 3:
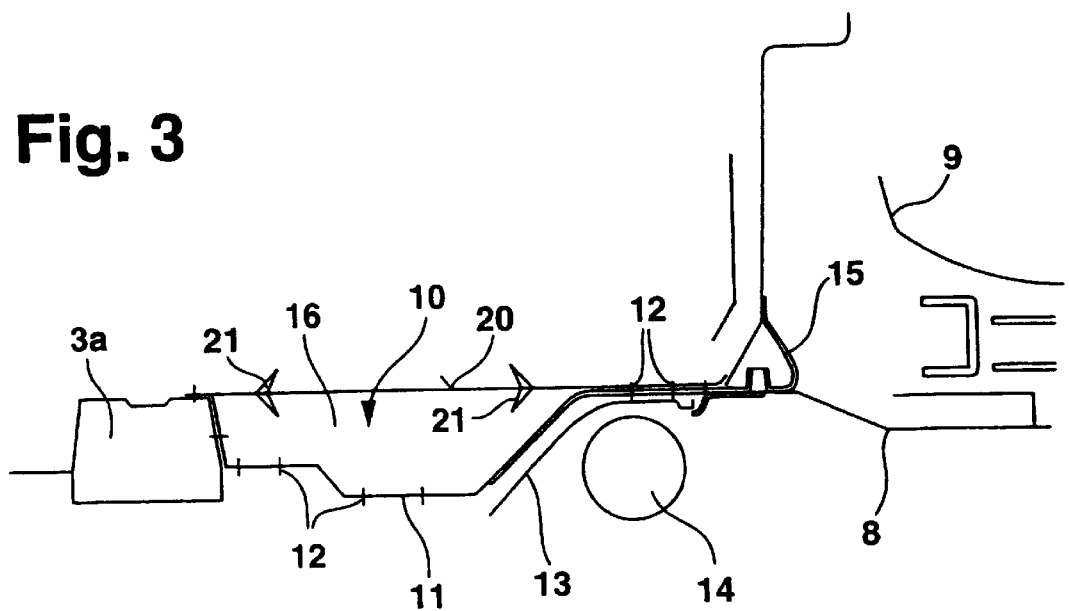
FIG. 3 is an enlarged representation of the detail III indicated in the dot-dash rectangle of FIG. 2.

FIGS. 2 and 3 show that the connection arms 10 are placed as profile pieces on the main floor 11 of the vehicle body and are welded in a known manner to the floor, to the engine transmission support 8 and to the member sections 3a by a point welding at the points marked by small dashes, of which some have the reference number 12 in FIG. 3. A shield 13 extends below the main floor and a respective exhaust system 14 extends below the shield 13. In the connection area to the connection arms 10, the engine transmission support 8 is provided with a reinforcement 15 which results in the formation of hollow members in the lower area of the tunnel and outside the engine transmission support 8.

Figure 4:
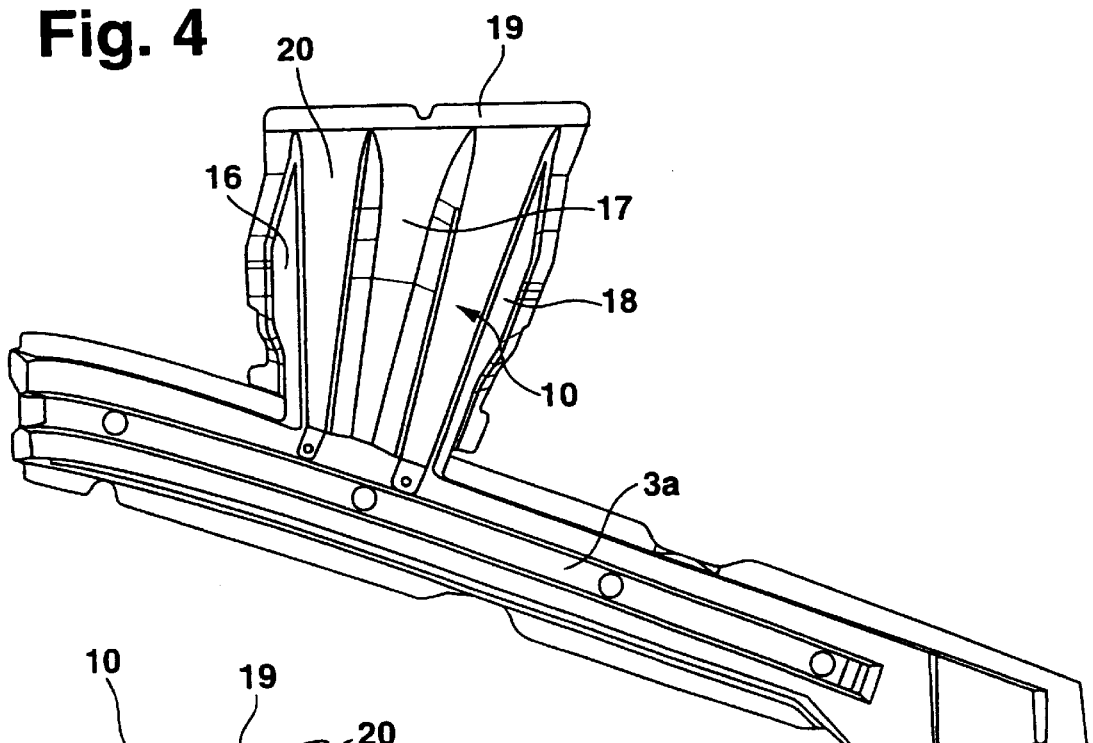
FIG. 4 is an enlarged top view of a part of the body shell according to FIG. 1 with the arrangement of a profile piece used for the reinforcement.
Figure 5:
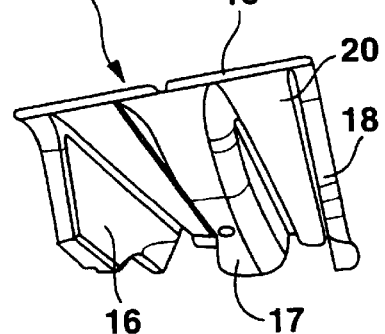
FIG. 5 is a perspective view from below of the profile piece which in FIG. 4 is connected with one of the member sections.

FIG. 4 is a view from below of one of the connection arms 10 and of one of the member sections 3a. FIG. 5 also shows that the connection arms 10 constructed as profile pieces are stamped from sheet metal and are trapezoidal components which are provided with projecting reinforcing ribs 16, 17, 18 and whose ribs project downward, while an upper surface 20 provided with an edge 19 is aligned approximately with the upper edge of the member sections 3a and with the connection area of the reinforcement 15 of the engine transmission support 8.

The profile pieces formed by the connection arms 10 have a basic trapezoidal shape which, in the installed condition (see also FIG. 1), is arranged such that one of the sides which extends transversely to the driving direction and in the embodiment is provided with the downward-projecting, almost wall-type rib 16, is disposed approximately perpendicularly on the vehicle center axis 4, while the opposite side of the trapezoid, which is provided with the rib 18, is disposed approximately perpendicularly to the diagonally extending member sections 3a. The edge 19 of the surface 20 corresponds to the size of one of the two other sides of the trapezoid. This edge 19 is welded to the engine transmission support 8, while the smaller side situated opposite the edge 19 is welded to the member section 3a. As a result, the reinforcing ribs 16, 17 and 18 extend, viewed from the member section 3a, approximately in a fan shape toward the outside. They therefore contribute to the desired reinforcement of the engine transmission support 8 with respect to the member sections 3a.

In a known manner, the member sections 3a are naturally also constructed as stamped profiles which can be welded to the main floor 11. The present invention recognizes that the connection arms constructed as profile pieces should establish a transverse connection between the two member sections 3a in the area of the engine transmission support 8 such that, as indicated by the arrows 21 in FIG. 3, tensile and pressure forces can be transmitted by the connection arms 10 between the member sections 3a and the engine transmission support 8. Thereby, in the event of a so-called offset crash, a rotation of the engine transmission unit and a resulting deformation of the vehicle body are effectively prevented.

In the illustrated embodiment, parallel side members 3 are shown whose distance to one another increases approximately in the area of the windshield as a result of diagonal member sections 3a. The present invention can also be implemented, however, if such diagonal member sections 3a are not provided. Also then, the side members 3 can be connected with the engine transmission support by connection arms 10 which are constructed as tension and pressure cross members as contemplated by the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body shell for a passenger car, comprising two side members between which a main floor extends, which main floor is provided with an engine transmission support for fastening a transmission case, and a transmission case-drive shaft accommodatable tunnel, the side members being spaced from each other behind a front end area of the car and having member sections which diverge with respect to a vehicle center axis, wherein, between the member sections and the engine transmission support, connection arms are operatively arranged as tension and pressure cross members and are trapezoidal profile pieces which are placed on and welded to the main floor and to the member sections, with a narrower side of the pieces being fastened to the side member sections, and the connection arms being provided with projecting reinforcing ribs which extend approximately in the shape of a fan from the member sections toward the outside of the body shell.

2. The body shell according to claim 1, wherein the engine transmission support is provided with reinforcing profiles in a connection area to the connection arms.

3. The body shell according to claim 1, wherein one of the sides of the trapezoidal components extend approximately perpendicularly to the vehicle center axis.

4. The body shell according to claim 1, wherein a flat top side of each component is aligned approximately horizontally with an upper edge of the member sections and is welded thereto, and undersides of the projecting ribs are welded to the main floor extending below the upper edge of the member sections.

* * * * *